March 4, 1969
J. KARP ET AL
3,430,988
PIPE COUPLING HAVING IDENTICAL HALVES FOR
JOINING PLASTIC PIPES
Filed Sept. 27, 1965
Sheet 1 of 3
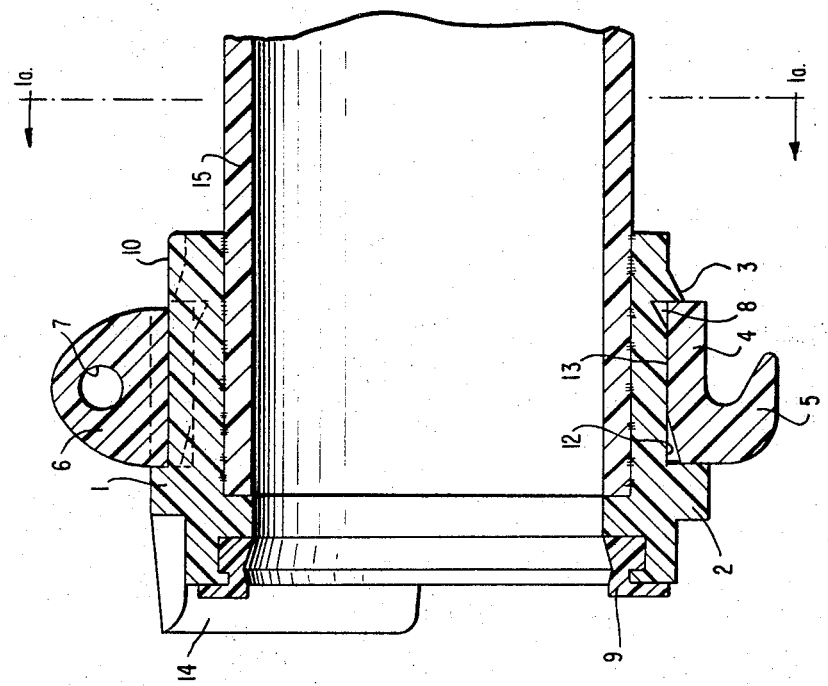
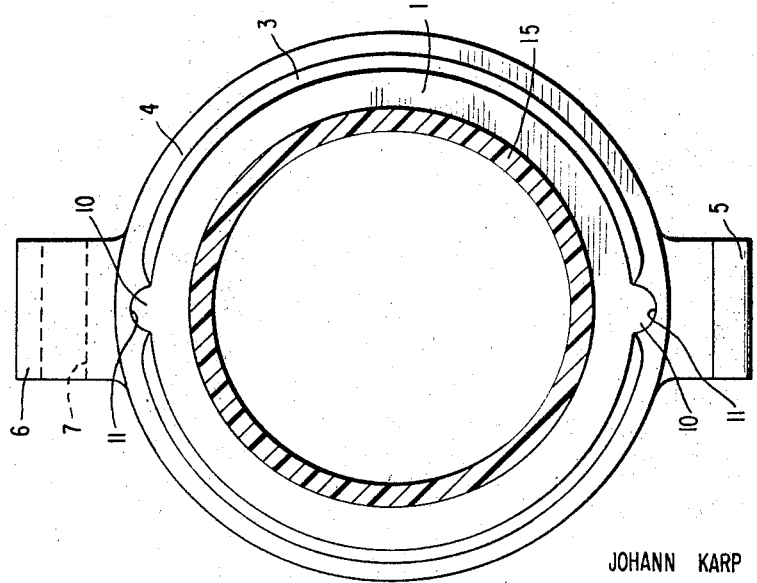
INVENTORS
JOHANN KARP
FRIEDHELM KREBSBACH
BY Dicke + Craig
ATTORNEYS

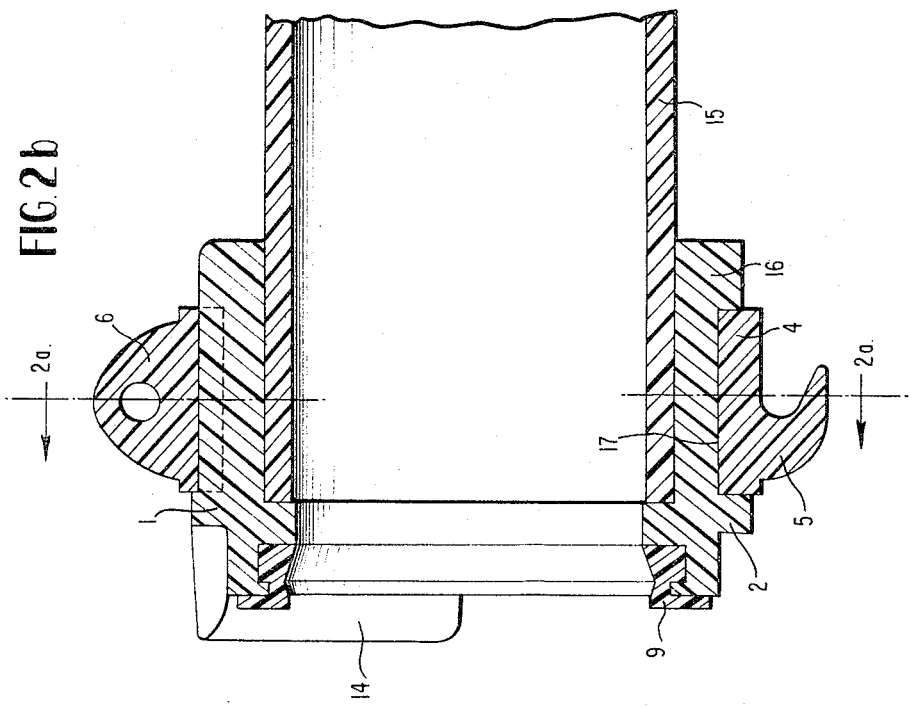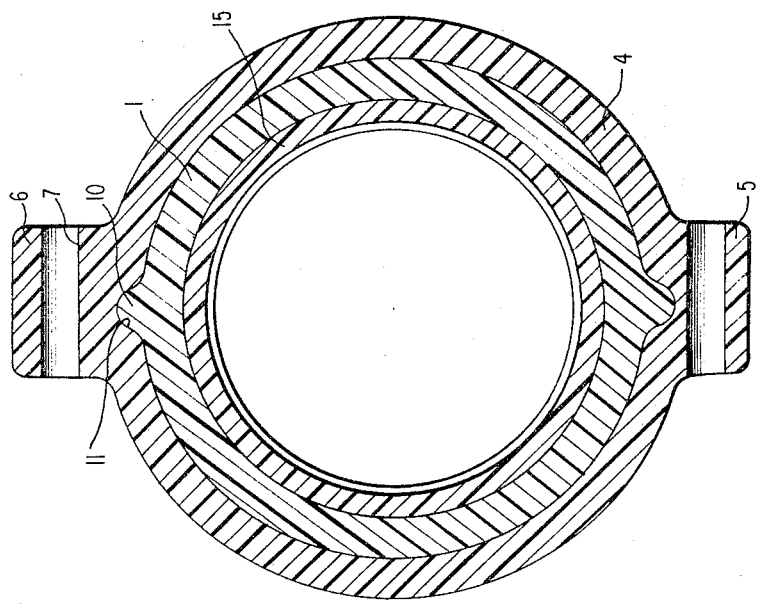

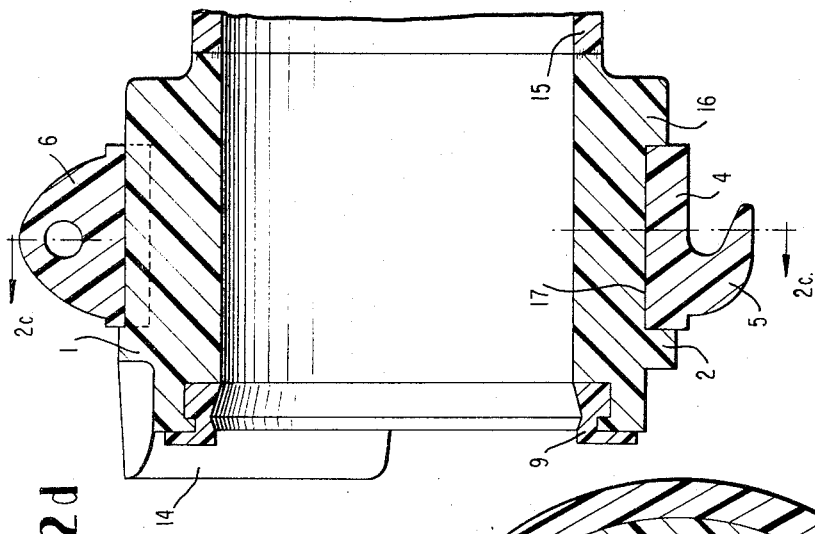
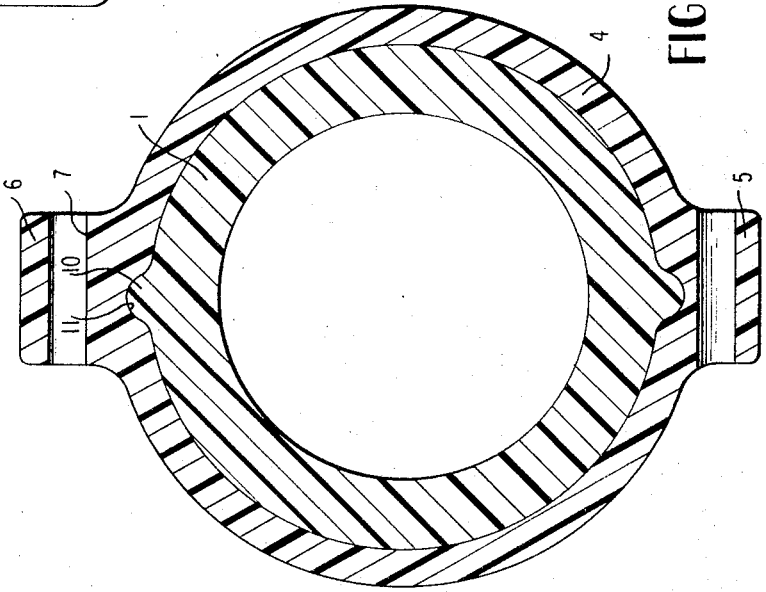
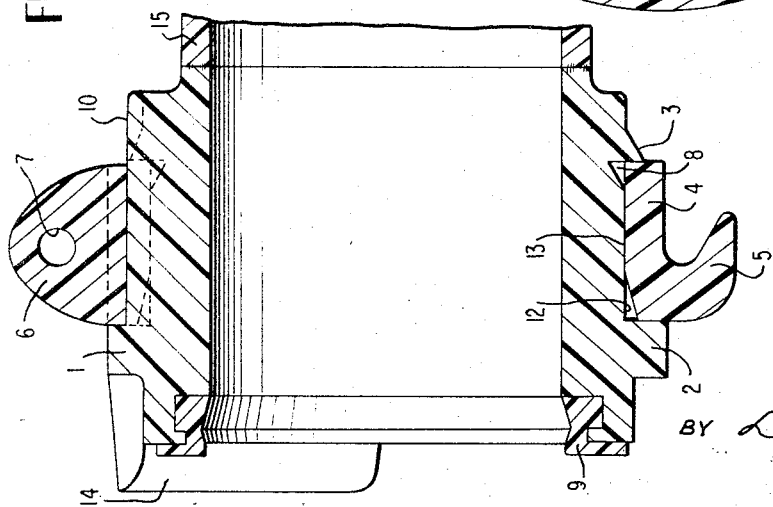

United States Patent Office 3,430,988
Patented Mar. 4, 1969

3,430,988
PIPE COUPLING HAVING IDENTICAL HALVES FOR JOINING PLASTIC PIPES
Johann Karp, Mondorf, and Friedhelm Krebsbach, Troisdorf, Germany, assignors to Dynamit Nobel Aktiengesellschaft, Troisdorf, Germany
Filed Sept. 27, 1965, Ser. No. 490,314
Claims priority, application Germany, Oct. 2, 1964,
D 45,547
U.S. Cl. 285—5        6 Claims
Int. Cl. F16l 37/08, 19/04

ABSTRACT OF THE DISCLOSURE

A coupling for each end of plastic pipes, to be connected together including a coupling body rigidly attached to the pipe and a harder and more rigid unitary annular ring connected to the outer circumference of the coupling body. Preferably, the coupling body is of the same plastic material as the pipe to provide a strong connection therewith and the ring is harder and more rigid to withstand the coupling stresses without deformations so that leaks will not occur. The coupling body may be telescoped with respect to or axially aligned with the pipe and connected therewith by welding, or the like. The ring may be made of hard and rigid synthetic plastic, metal or the like. The ring and coupling body may be provided with interengaging splines, or the like, to prevent relative rotation and may be provided with suitable wedged and conical surfaces so that the ring may be snapped over the coupling body by deforming the softer coupling body.

---

The present invention relates to a coupling for the rapid connection and disconnection of plastic pipes as are used, for example, in irrigation lines.

For such occasions couplings are already known which are manufactured, like the pipes, of plastic material and which consist of two identically similar coupling halves having a coupling body as well as a hook formed thereon and an eye or lug for the fastening of appropriate clamping rods. Depending on the stresses occurring in practice, such plastic materials are chosen as material for the pipes which are tough and elastic, whence also the coupling consists necessarily in that case of tough and elastic plastic material. This, however, entails the disadvantage that highly stressed coupling parts are flexible and pliable so that at least at high loads and under high stresses the completely satisfactory seal between the two coupling halves is jeopardized. One attempt to counter this disadvantage is that the coupling was made of a different material or even of metal. However, in that case, there results the necessity to connect with each other pipes and couplings of different materials whereby the attainment of a tight and secure connection becomes relatively difficult and costly, as, for example, with a known type of securing means in which a steel ring serrated or fluted in a saw-tooth like manner in the longitudinal direction is molded integral into the coupling halves, into which steel ring the pipe is inserted and subsequently is pressed in by a rolling-in operation of a copper pipe piece.

The purpose of the present invention is to produce a coupling of the aforementioned type in which the coupling bodies, for reasons of their simple, good and tight connectability by welding to the pipes, like the latter are made of plastic material, and more particularly are made of the same plastic material, which coupling bodies, however, are also capable of absorbing higher loads and stresses without danger of leakiness or inadequate tightness. Accordingly, the present invention proposes to provide the coupling body along the circumference thereof with a unitary or endless ring of hard, highly rigid plastic material or metal abutting against an annularly shaped shoulder formed in the direction toward the side of the connection, which unitary ring is provided with the hook and the eye, mutually displaced by 180 degrees, for the securing of suitable known clamping means. In this manner, not only a uniform loading of the coupling bodies over the entire circumference thereof is assured, but also the load forces are distributed over a relatively large surface so that the specific stress of the material remains relatively slight.

The assembly of the ring can take place either by a forcing-on or pressing-on operation or by being molded into the body, whereby it is appropriate to mount the ring so as to be secured against rotation. This can be achieved in that the coupling body is constructed along its circumference with strip-like or flute-like reinforcements extending from the shoulder to the end surface on the pipe side and in that the ring is correspondingly constructed with axial grooves serving simultaneously for centering purposes during the pressing-on operation, whereby it is particularly advantageous to provide reinforcements and grooves within the area of the hook and of the eye since a relatively large amount of material is already present thereat, and the ring therefore does not need to be weakened in a dangerous manner. It is recommended according to the present invention for facilitating the pressing-on of the ring to construct the inner cross section of the ring in such a manner that the latter is slightly conically enlarged from the pipe to the coupling side thereof. In addition thereto, it may also be appropriately provided that the inner diameter of the ring is conically enlarged more strongly at the end near the shoulder side so that a good initial engagement is achieved during the assembly.

According to a further appropriate development of the present invention, it is proposed to construct the coupling bodies with a wedge-shaped annular bulge to the rear of the mounted ring. In order that the material of this bulge can easily escape during the pressing-on operation, there is provided according to a further feature of the present invention, adjacent the bulge on the side toward the pressed-on ring a wedge-shaped correspondingly dimensioned annular groove.

Accordingly, it is an object of the present invention to provide a coupling for plastic pipes which is simple in construction and relatively inexpensive, yet eliminates the aforementioned drawbacks and shortcomings encountered with the prior art constructions.

It is another object of the present invention to provide a coupling for plastic pipe lines in which all highly stressed coupling parts may be made of appropriate materials without jeopardizing a completely satisfactory seal between the coupling parts.

A further object of the present invention resides in the provision of a coupling for plastic pipe lines which permits a tight and secure connection by extremely simple and inexpensive means.

A still further object of the present invention resides in the provision of a coupling for plastic pipe lines in which a coupling part may be made of the same plastic material as the pipe line.

Another object of the present invention is a plastic coupling for plastic pipelines which may be easily assembled and installed without great expenditures.

A still further object of the present invention resides in the provision of a coupling for plastic pipelines in which the specific loads and stresses occurring in the plastic material are kept relatively small by a good distribution of the forces over large areas without jeopardizing the simplicity of the design or of its connectability.

Another object of the present invention resides in the provision of a plastic coupling for plastic pipelines in which all parts may be readily assembled and installed notwithstanding a design which assures high strength and sturdiness in the overall construction.

These and further objects, features and advantages of the present invention will become more obvious from the following description when taken in connection with the accompanying drawings, which show for purpose of illustration only, several embodiments in accordance with the present invention and wherein:

FIGURE 1a is a transverse cross sectional view through a first embodiment of a coupling in accordance with the present invention, taken along line 1a—1a of FIGURE 1b, in which the ring is pressed on the coupling body;

FIGURE 1b is an axial cross sectional view through the coupling of FIGURE 1a in which the coupling body is secured to the outer surface of the pipe;

FIGURE 1c is an axial cross sectional view similar to FIGURE 1b, illustrating a similar coupling in which the pipe is connected to the coupling body by butt welding;

FIGURE 2a is a transverse cross sectional view taken along line 2a–2a of FIGURE 2b and representing a modified embodiment of a coupling in accordance with the present invention in which the ring is molded into the body and the coupling is mounted over the pipe end;

FIGURE 2d is an axial cross sectional view through the coupling of FIGURE 2a;

FIGURE 2c is a transverse cross sectional view, similar to FIGURE 2a, taken along line 2c–2c of FIGURE 2d, in which the ring is molded into the body and the pipe is butt welded to the coupling body, and FIGURE 2d is an axial cross sectional view thorugh the coupling of FIGURE 2c.

Referring now to the drawing wherein like reference numerals are used throughout the various views to designate like parts, reference numeral 1 designates in all figures the plastic coupling body provided at the coupling end with a shoulder-like annular collar 2. Near the other end, the coupling body 1 of FIGURES 1a, 1b, and 1c is provided with an annular bulge 3. The ring 4 is pressed-on over the circumference of the coupling body 1 with an accurate fit and with flush abutment at the end face thereof between the annular collar 2 and the annular bulge 3 and is provided with a hook 5 as well as with an eye 6 having a bore 7 for the fastening of a clamping means of any conventional construction (not illustrated), whereby the hook 5 and the eye 6 are displaced by 180 degrees with respect to each other. The inner surface 13 of the ring 4 is slightly conically enlarged from the pipe end toward the shoulder end and is provided with a more pronounced conical enlargement near the shoulder end 12. A wedge-shaped annular groove 8 is formed within the body 1 directly adjacent the annular bulge 3 on the side facing the ring 4. For purposes of securing the ring 4 against rotation relative to the coupling body 1, strip-like or flute-like elements 10 are provided along the circumference of the coupling body 1 which extend in the axial direction and engage in corresponding grooves 11 of the ring 4. The strip- or flute-like elements 10 extend to the pipe end of the coupling body 1 for purposes of centering during the pressing-on operation of the ring 4. A seal 9 is installed at the connecting end of the coupling body 1. Flanges or shields 14 are arranged also at this connecting end of the coupling body 1 which are displaced with respect to each other by 180 degrees. These flanges 14 extend each approximately over a quarter of the circumference and serve for the protection of the connecting parts between the two coupling bodies to be coupled with one another. For sake of clarity, only one of these flanges or shields 14 is shown in the drawing, it being understood that the other flanges or shields are of identical construction.

As can be seen in FIGURE 1b, the coupling body 1 can be welded onto the circumference of the pipe 15, for example, by means of friction welding. In the alternative, as illustrated in FIGURE 1c, the coupling body 1 can also be butt welded to the end of the pipe 15. In the latter case the wall thickness of the coupling body 1 is constructed larger by an amount corresponding to the wall thickness of the pipe 15.

The construction according to FIGURES 2a, 2b 2c and 2d substantially corresponds to that of FIGURES 1a, 1b and 1c, only in the former the ring 4 is molded into the coupling body 1, and more particularly into the annular groove 17 between the annularly shaped cylindrical flanges 2 and 16 thereof. Also in the embodiments of FIGURES 2a–2d, the two parts consisting of the coupling body 1 and the ring 4 are connected to each other in a non-rotatable manner, i.e., to prevent relative rotation therebetween by means of mutually engaging axial ribs 10 and grooves 11. As in FIGURES 1a and 1b, the welding of the coupling body 1 may again be realized by means of friction welding along the circumference of the pipe 15, as illustrated in FIGURES 2a and 2b, or by means of butt welding to the end of the pipe 15 as illustrated in FIGURES 2c and 2d.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A self-contained quick disengageable and engageable coupling for plastic pipes, comprising: two synthetic plastic pipes to be connected; two identical coupling halves, each coupling half including a tubular coupling body made of substantially the same synthetic plastic material as the synthetic plastic pipes to be connected; means for rigidly bonding each of said tubular coupling bodies directly to the exterior of the pipes to be connected; each coupling body having a forward coupling end and a rear end; an annular exterior shoulder on the forward end of each coupling body; each coupling half further including a single piece ring of substantially more hard and more rigid material than said coupling body plastic material being mounted on the exterior of each coupling body and having a forward end in axial abutting engagement with its coupling body shoulder; each ring being provided with an eye means having a transverse bore for receiving therein a clamping rod for pivotal movement about an axis substantially perpendicular to the axis of its tubular coupling body and being provided with a hook on the diametrically opposite side of said ring from said eye means for lockingly receiving therein the corresponding clamping rod of the other coupling body to constitute means for forward end to forward end clamping connection of said two coupling bodies in a secure and tight manner; the interior of each ring and the exterior of each coupling body having inter-engaging means preventing relative rotation therebetween; exterior abutment means on the rear end of each coupling body engaging the rear end of its ring preventing rearward axial movement of said ring relative to said coupling body.

2. The coupling according to claim 1, further comprising said coupling body having an interior annular flange with an interior diameter substantially identical to the interior diameter of the pipe to be connected for rear abutment with the end face of the pipe to be connected.

3. The coupling according to claim 2, further comprising the forward end of each coupling body having an inwardly opening annular channel; an elastic sealing ring in said annular channel and provided with a forwardly extending portion integral at its forward end with a radially extending flange radially overlapping the forward end of said coupling body.

4. The coupling according to claim 3, further comprising said rear abutment means including a forwardly and outwardly inclined annular ramp abutment integral with each coupling body exterior to constitute a snap action type lock; the forward end of each ring having a rearwardly and inwardly inclined corresponding ramp surface on its interior or camming said rear abutment means inwardly during assembly of said ring on said coupling body by moving said ring forwardly over said coupling body; the rearward end of each coupling body having an annular recess immediately forward of said ramp surface of substantially less diameter than the interior diameter of said ring.

5. The coupling according to claim 1, further comprising the forward end of each coupling body having an inwardly opening annular channel; an elastic sealing ring in said annular channel and provided with a forwardly extending portion integral at its forward end with a radially extending flange radially overlapping the forward end of said coupling body.

6. The coupling according to claim 1, further comprising said rear abutment means including a forwardly and outwardly inclined annular ramp abutment integral with each coupling body exterior to constitute a snap action type lock; the forward end of each ring having a rearwardly and inwardly inclined corresponding ramp surface on its interio rfor camming said rear abutment means inwardly during assembly of said ring on said coupling body by moving said ring forwardly over said coupling body; the rearward end of each coupling body having an annular recess immediately forward of said ramp surface of substantially less diameter than the interior diameter of said ring.

References Cited

UNITED STATES PATENTS

| 2,374,574 | 4/1945 | Adams | 285—423 X |
| 410,552 | 9/1889 | Kennedy | 285—72 |
| 466,340 | 1/1892 | Gold et al. | 285—71 X |
| 1,204,650 | 11/1916 | Claflin | 285—253 X |
| 3,265,414 | 8/1964 | Reid et al. | 285—423 X |

FOREIGN PATENTS

| 660,072 | 7/1963 | Canada. |
| 81,743 | 6/1956 | Netherlands. |

THOMAS F. CALLAGHAN, *Primary Examiner.*

U.S. Cl. X.R.

285—74, 284, 423